(12) United States Patent
Kimura et al.

(10) Patent No.: US 11,118,563 B2
(45) Date of Patent: Sep. 14, 2021

(54) WIND TURBINE GENERATOR SYSTEM, WIND TURBINE BLADE, AND REINFORCING METHOD FOR WIND TURBINE BLADE

(71) Applicant: MITSUBISHI HEAVY INDUSTRIES, LTD., Tokyo (JP)

(72) Inventors: Yasutaka Kimura, Tokyo (JP); Takao Kuroiwa, Tokyo (JP); Keisuke Ota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 278 days.

(21) Appl. No.: 16/019,462

(22) Filed: Jun. 26, 2018

(65) Prior Publication Data

US 2018/0306167 A1 Oct. 25, 2018

Related U.S. Application Data

(63) Continuation of application No. 15/705,245, filed on Sep. 14, 2017.

(30) Foreign Application Priority Data

Feb. 9, 2017 (JP) .............................. JP2017-021890

(51) Int. Cl.
*F03D 1/06* (2006.01)
*B29C 73/10* (2006.01)
(Continued)

(52) U.S. Cl.
CPC ............ *F03D 1/0675* (2013.01); *B29C 73/10* (2013.01); *B32B 5/26* (2013.01); *B32B 27/36* (2013.01);
(Continued)

(58) Field of Classification Search
CPC ....... F03D 1/0675; F03D 80/50; B29C 73/10; B29C 73/14; B32B 5/142; B32B 5/26; B32B 2603/00; F05B 2280/702
See application file for complete search history.

(56) References Cited

U.S. PATENT DOCUMENTS

| 4,260,332 A | 4/1981 | Weingart et al. |
| 4,524,499 A | 6/1985 | Grimes et al. |

(Continued)

FOREIGN PATENT DOCUMENTS

| EP | 2615304 A1 | 7/2013 |
| EP | 2677170 A1 | 12/2013 |

(Continued)

OTHER PUBLICATIONS

Advisory Action for U.S. Appl. No. 15/705,245 dated Oct. 5, 2018; 6pp.

(Continued)

*Primary Examiner* — Woody A Lee, Jr.
*Assistant Examiner* — Brian O Peters
(74) *Attorney, Agent, or Firm* — Kanesaka Berner & Partners LLP

(57) ABSTRACT

A wind turbine blade is reinforced while suppressing possible stress concentration resulting from a load imposed on a blade root portion of the wind turbine blade in a flap direction. The wind turbine blade includes a blade main body extending from the blade root portion toward a blade tip portion and an FRP reinforcing layer formed so as to cover at least a part of the outer surface of the blade root portion of the blade main body. The FRP reinforcing layer includes a plurality of laminated fiber layers and a resin with which the plurality of fiber layers is impregnated. The FRP reinforcing layer is formed such that, in a cross section along a longitudinal direction of the blade main body, both ends of (Continued)

the plurality of laminated fiber layers in the longitudinal direction are tapered.

18 Claims, 12 Drawing Sheets

(51) Int. Cl.
  *B32B 5/26* (2006.01)
  *B32B 27/38* (2006.01)
  *F03D 80/50* (2016.01)
  *B32B 27/36* (2006.01)

(52) U.S. Cl.
  CPC ............. *B32B 27/38* (2013.01); *F03D 80/50* (2016.05); *B32B 2250/05* (2013.01); *B32B 2305/28* (2013.01); *B32B 2363/00* (2013.01); *B32B 2367/00* (2013.01); *B32B 2603/00* (2013.01); *F05B 2240/21* (2013.01); *F05B 2240/30* (2013.01); *F05B 2280/6013* (2013.01); *F05B 2280/6015* (2013.01); *F05B 2280/702* (2013.01); *Y02E 10/72* (2013.01)

(56) References Cited

U.S. PATENT DOCUMENTS

| | | | |
|---|---|---|---|
| 6,843,953 | B2 | 1/2005 | Filainger et al. |
| 7,334,989 | B2 | 2/2008 | Arelt |
| 7,927,077 | B2 | 4/2011 | Olson |
| 8,043,067 | B2 | 10/2011 | Kuroiwa et al. |
| 8,091,229 | B2 | 1/2012 | Deak et al. |
| 8,826,534 | B2 | 9/2014 | Cappelli et al. |
| 9,073,270 | B2 * | 7/2015 | Bech ..................... B32B 27/38 |
| 9,890,483 | B2 | 2/2018 | Hayashi |
| 2010/0135820 | A1 | 6/2010 | Olson |
| 2010/0227117 | A1 * | 9/2010 | Dan-Jumbo ............ B32B 19/04 428/139 |
| 2011/0135485 | A1 | 6/2011 | Wang |
| 2011/0171038 | A1 | 7/2011 | Esaki et al. |
| 2015/0093250 | A1 | 4/2015 | Busbey et al. |
| 2016/0273516 | A1 | 9/2016 | Smith et al. |

FOREIGN PATENT DOCUMENTS

| | | |
|---|---|---|
| EP | 2733350 A2 | 5/2014 |
| EP | 2927482 A1 | 10/2015 |
| JP | S62-282177 A | 12/1987 |
| JP | 2006-123277 A | 5/2006 |
| JP | 2007-255366 A | 10/2007 |
| JP | 2007-263098 A | 10/2007 |
| JP | 2012-172560 A | 9/2012 |
| WO | 2011/078327 A1 | 6/2011 |
| WO | 2014/096002 A2 | 6/2014 |
| WO | 2016/079535 A1 | 5/2016 |
| WO | 2016150445 A1 | 9/2016 |

OTHER PUBLICATIONS

Office Action in U.S. Appl. No. 15/705,245, dated Jul. 20, 2018, 15pp.

Extended European Search Report in EP Application No. 17200887.2, dated May 25, 2018. 7pp.

Office Action for U.S. Appl. No. 15/705,245 dated Jan. 4, 2019; 14pp.

Office Action in JP Application 2017-021890, dated Aug. 3, 2018, 9pp.

* cited by examiner

WIND TURBINE GENERATOR SYSTEM, WIND TURBINE BLADE, AND REINFORCING METHOD FOR WIND TURBINE BLADE

RELATED APPLICATIONS

The present application is a continuation of U.S. application Ser. No. 15/705,245 filed Sep. 14, 2017, and claims priority from Japanese Application Number 2017-021890, filed Feb. 9, 2017, the disclosure of which is hereby incorporated by reference herein in its entirety.

TECHNICAL FIELD

The disclosure relates to a wind turbine generator system, a wind turbine blade, and a reinforcing method for a wind turbine blade.

BACKGROUND

As is known, loads in various directions act on wind turbine blades used in a wind turbine generator system (hereinafter referred to as a windmill). In particular, at the time of a strong wind, a heavy load acts on a blade root portion of each wind turbine blade in a flap direction. On the other hand, windmills are generally required to have a prolonged service life. Thus, there have been growing needs to provide wind turbine blades with additional reinforcements as needed in order to deal with possible degradation of or possible fatigue damage to the wind turbine blades resulting from long-term use thereof.

In regard to reinforcement of the wind turbine blades, Patent Document 1 discloses a technique for adding reinforcing ribs to an inner circumference or an outer circumference of the blade root portion of the wind turbine blade along a circumferential direction of the blade root portion. Specifically, in the technique disclosed in Patent Document 1, circular-arc-shaped reinforcing ribs are additionally provided around a part or all of the inner or outer circumference of the blade root portion. Both ends of the circular arc of each of the ribs are tapered along the circumferential direction of the blade root portion.

CITATION LIST

Patent Literature

Patent Document 1: US 2015-093250 A1

SUMMARY

However, although Patent Document 1 discloses the reinforcing technique for preventing the blade root portion, which is cross-sectionally shaped generally like a cylinder as viewed in an axial direction along a longitudinal direction of the wind turbine blade, from being deflected by a load and deformed into an elliptic shape, this document discloses no measures against the load acting on the blade root portion in the flap direction. Thus, in Patent Document 1, the thickness of the wind turbine blade including the rib varies sharply at a boundary between a part of the blade root portion to which the rib has been added and a part thereof to which no rib has been added, disadvantageously resulting in stress concentration when a load is imposed.

An object of at least several embodiments of the present invention is to reinforce the wind turbine blades while suppressing possible stress concentration resulting from a load imposed on the blade root portion of each wind turbine blade in the flap direction.

(1) A wind turbine blade according to at least one embodiment includes:

a blade main body extending from a blade root portion toward a blade tip portion; and an FRP reinforcing layer formed so as to cover at least a part of an outer surface of the blade root portion of the blade main body, and the FRP reinforcing layer includes:

a plurality of laminated fiber layers; and a resin with which the plurality of fiber layers is impregnated, and the FRP reinforcing layer is formed such that, in a cross section along a longitudinal direction of the blade main body, both ends of the plurality of laminated fiber layers in the longitudinal direction thereof are tapered.

According to the configuration in (1), at least a part of the outer surface of the blade root portion of the blade main body may be covered, for reinforcement, with the FRP reinforcing layer including the plurality of fiber layers impregnated with the resin. In a cross section along the longitudinal direction of the blade main body, both ends of the FRP reinforcing layer in the longitudinal direction of the plurality of laminated fiber layers are tapered. This inhibits a sharp variation in the thickness of the root portion of the wind turbine blade including the FRP reinforcing layer in the longitudinal direction of the blade root portion. Therefore, the configuration in (1) allows the wind turbine blade to be reinforced while appropriately suppressing possible stress concentration resulting from a load imposed on the blade root portion of the wind turbine blade in the flap direction.

(2) In several embodiments, in the configuration described in (1), a first tapered shape of a blade tip-side end of both the ends of the plurality of laminated fiber layers is gentler than a second tapered shape of a blade root-side end of both the ends of the plurality of laminated fiber layers.

In the configuration in (2), both ends of the plurality of laminated fiber layers may be formed such that the first tapered shape of the blade tip-side end, which has a spare installation area, has a sufficiently gentler inclination than the second tapered shape of the blade root-side end. Therefore, the thickness of the blade root portion may vary sufficiently gradually in the longitudinal direction, allowing the wind turbine blade to be reinforced while suitably suppressing possible stress concentration resulting from a load in the flap direction.

(3) In several embodiments, in the wind turbine blade described in (1) or (2), the first tapered shape of the blade tip-side end of both the ends of the plurality of laminated fiber layers has an inclined surface with a gradient of 5% or less with respect to the longitudinal direction.

In the configuration in (3), the inclined surface of the blade tip-side end of the fiber layers may have a sufficiently gentle gradient of 5% or less with respect to the longitudinal direction of the wind turbine blade. Consequently, the thickness of the blade root portion may vary sufficiently gradually in the longitudinal direction, allowing the wind turbine blade to be reinforced while appropriately suppressing possible stress concentration resulting from a load in the flap direction.

(4) In several embodiments, in the wind turbine blade described in any one of (1) to (3), the FRP reinforcing layer is formed such that, in a cross section of the blade root portion, both ends of the plurality of laminated fiber layers in a circumferential direction of the blade root portion are tapered.

In the configuration in (4), both ends of the FRP reinforcing layer in the circumferential direction of the blade root portion are cross-sectionally tapered. Thus, the thickness of the blade root portion may vary sufficiently gradually in the circumferential direction to suppress possible stress concentration, while allowing the wind turbine blade to be reinforced.

(5) In several embodiments, in the wind turbine blade described in any one of (1) to (4), the FRP reinforcing layer includes an intermediate layer positioned between the outer surface of the blade root portion and the plurality of fiber layers and formed of a multidirectional fiber layer.

In the configuration in (5), the intermediate layer formed of the multidirectional fiber layer is arranged between the outer surface of the blade root portion and the plurality of fiber layers, allowing the fiber layers to be more appropriately bonded to the outer surface of the wind turbine blade. The multidirectional fiber layer refers to a layer in which fibers are arranged in a plurality of directions unlike a unidirectional fiber layer in which fibers are arranged in a single direction.

(6) In several embodiments, in the wind turbine blade described in (5), the intermediate layer is a DBM or a chopped strand mat.

In the configuration in (6), the DBM or the chopped strand mat easily allows the fiber layers to be more appropriately bonded to the outer surface of the wind turbine blade.

(7) In several embodiments, in the wind turbine blade described in any one of (1) to (6), the number of the laminated fiber layers is 10 or more and 100 or less.

In the configuration in (7), the wind turbine blade may be reinforced by forming the fiber layers to a needed thickness according to the distribution of stress near the blade root portion of the wind turbine blade.

(8) In several embodiments, in the wind turbine blade described in any one of (1) to (7), the resin is a polyester resin or an epoxy resin.

In the configuration in (8), the FRP reinforcing layer may be formed by impregnating the fiber layers with a thermoplastic resin such as the polyester resin or the epoxy resin, which is then cured.

For example, if the fiber layers are impregnated with the polyester resin, which is then cured, then the resin is cured by self-heating, eliminating the need for an external heating operation to allow the FRP reinforcing layer to be easily and inexpensively formed. If the fiber layers are impregnated with the epoxy resin, which is then cured, an FRP reinforcing layer may be formed which can be appropriately bonded to the outer surface of the blade root portion.

(9) In several embodiments, in the wind turbine blade described in any one of (1) to (8), the blade main body includes:

a suction-side half-section and a pressure-side half-section that is joined to the suction-side half-section, and the FRP reinforcing layer is formed, in the circumferential direction of the blade root portion, within an angular range of $\theta_0-50$ degrees$\leq\theta\leq\theta_0+50$ degrees when an angular position of a center of a circular arc defined in a cross section of the blade root portion by at least one of the suction-side half-section or the pressure-side half-section is denoted by $\theta_0$.

The configuration in (9) allows appropriate reinforcement of a part of the blade root portion on which a heavy load is imposed in the flap direction by bending stress.

(10) In several embodiments, in the wind turbine blade described in any one of (1) to (9), the blade main body has in the blade root portion a bolt hole through which the wind turbine blade is attached to a hub, and the FRP reinforcing layer is provided further toward a blade tip side than an extension range of the bolt hole in the longitudinal direction.

In the configuration in (10), the FRP reinforcing layer is provided further toward the blade tip side than the extension range of the bolt hole through which the wind turbine blade is attached to the hub. In other words, the FRP reinforcing layer is inhibited from closing the bolt hole through which the wind turbine blade is attached to the hub. Therefore, the wind turbine blade may be reinforced without hampering a function to attach the hub to the wind turbine blade via the bolt hole or an operation of performing such attachment.

(11) A wind turbine generator system according to at least several embodiments includes the wind turbine blade described in any one of (1) to (10).

The configuration in (11) can provide a wind turbine generator system with the wind turbine blade including the FRP reinforcing layer in which, in a cross section along the longitudinal direction of the blade main body, both ends of the FRP reinforcing layer in the longitudinal direction of the plurality of laminated fiber layers are tapered, allowing the wind turbine blade to be appropriately reinforced while suppressing possible stress concentration resulting from a load imposed on the blade root portion of the wind turbine blade in the flap direction.

(12) A reinforcing method for a wind turbine blade according to at least several embodiments includes:

laminating fiber layers on an outer surface of a blade root portion of a wind turbine blade so as to cover at least a part of the outer surface; and impregnating the laminated fiber layers with a resin and curing the same to form an FRP reinforcing layer on the outer surface of the blade root portion, and the fiber layers are laminated such that, in a cross section along a longitudinal direction of the wind turbine blade, both ends of the plurality of laminated fiber layers in the longitudinal direction are tapered.

In the method in (12), as described in (1), in a cross section along the longitudinal direction of the blade main body, both ends of the FRP reinforcing layer in the longitudinal direction of the plurality of laminated fiber layers are tapered, thus inhibiting a sharp variation in the thickness of the root portion of the wind turbine blade including the FRP reinforcing layer in the longitudinal direction of the blade root portion. Therefore, the method allows the wind turbine blade to be reinforced while appropriately suppressing possible stress concentration resulting from a load imposed on the blade root portion of the wind turbine blade in the flap direction.

(13) In several embodiments, in the method described in (12), a first tapered shape of a blade tip-side end of both the ends of the plurality of laminated fiber layers is gentler than a second tapered shape of a blade root-side end of both the ends of the plurality of laminated fiber layers.

In the method in (13), as described in (2), both ends of the plurality of laminated fiber layers may be formed such that the first tapered shape of the blade tip-side end, which has a spare installation area, has a sufficiently gentler inclination than the second tapered shape of the blade root-side end. Therefore, the thickness of the blade root portion may vary sufficiently gradually in the longitudinal direction, allowing the wind turbine blade to be reinforced while suitably suppressing possible stress concentration resulting from a load in the flap direction.

(14) In several embodiments, the method described in (12) or (13) further includes:

roughening at least a configuration area of the outer surface of the blade root portion where the FRP reinforcing layer is to be configured; and forming an intermediate layer in the roughened configuration area of the outer surface of the blade root portion, wherein the fiber layers are laminated on the intermediate layer.

The method in (14) may involve, instead of laminating the fiber layers directly on the outer surface of the blade root portion, roughening at least the configuration area of the outer surface of the blade root portion where the FRP reinforcing layer is to be configured, forming the intermediate layer in the roughened configuration area, and laminating the fiber layers on the intermediate layer. Therefore, by using, as the intermediate layer, for example, a material that can be appropriately bonded to the outer surface of the wind turbine blade and to the fiber layers, the fiber layers may be more appropriately bonded to the outer surface of the wind turbine blade. Consequently, the FRP reinforcing layer may be formed more integrally with the wind turbine blade, allowing the wind turbine blade to be more firmly reinforced.

(15) In several embodiments, in the method described in any one of (12) to (14), the step of forming of the FRP reinforcing layer includes:
covering the laminated fiber layers with a bag;
decompressing a space enclosed by the outer surface of the blade root portion and the bag; and
injecting a resin into the space to impregnate the fiber layers with the resin.

In the method in (15), the fiber layers laminated on the outer surface of the blade root portion are covered with the bag, the space enclosed by the outer surface of the blade root portion and the bag is decompressed, and the resin is injected into the decompressed space. Therefore, the resin may be infiltrated throughout the fiber layers, providing an FRP reinforcing layer having few voids and a high strength.

At least one embodiment of the present invention allows the wind turbine blade to be reinforced while suppressing possible stress concentration resulting from a load imposed on the blade root portion of the wind turbine blade in the flap direction.

DETAILED DESCRIPTION

Figure 1:
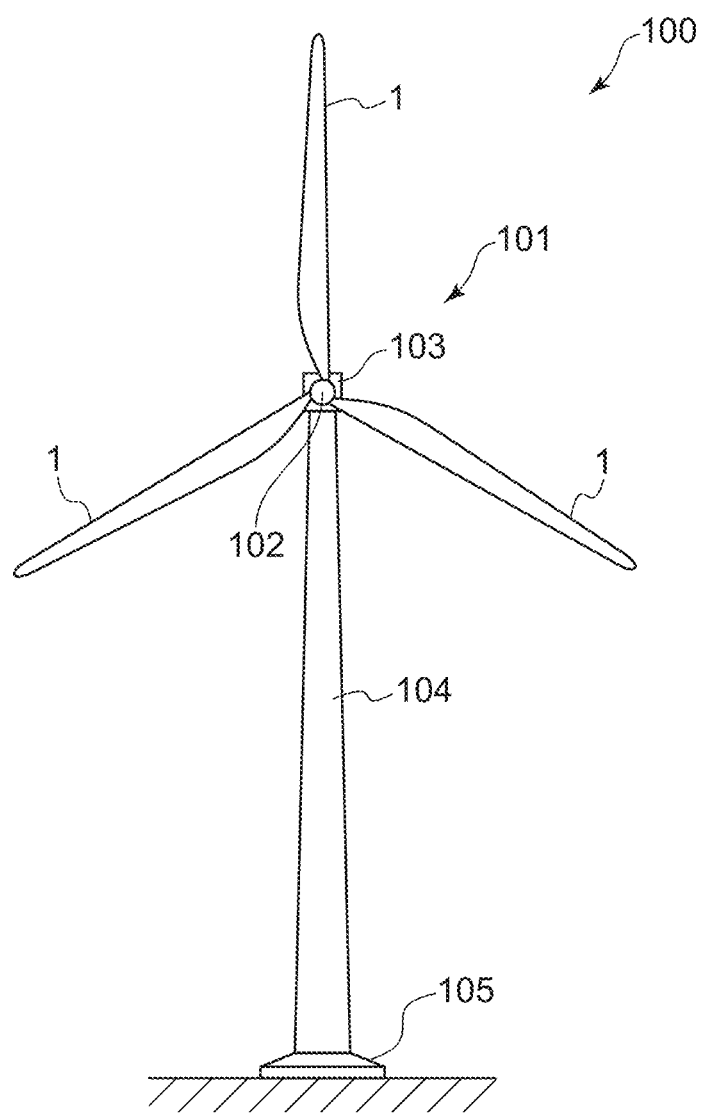
FIG. 1 is a schematic diagram depicting a wind turbine generator system according to an embodiment.

Several embodiments of the present invention will be described below with reference to the attached drawings. However, dimensions, materials, shapes, relative arrangements, and the like of components described in the embodiments or depicted in the drawings are not intended to limit the scope of the present invention thereto and are only illustrative.

For example, not only do expressions for relative or absolute arrangements such as "in a certain direction", "along a certain direction", "parallel", "orthogonal", "central", "concentric", and "coaxial" exactly represent such arrangements but also represent relative displacements with tolerances or such angles or distances as allow the same functions to be fulfilled.

For example, not only do expressions for equal states of things such as "the same", "equal", and "homogeneous" represent exactly equal states but also represent states with tolerances or such differences as allow the same functions to be fulfilled.

For example, not only expressions for shapes such as a rectangular shape and a cylindrical shape represent shapes such as a rectangular shape and a cylindrical shape in a geometrically strict sense but also represent such shapes including a recessed and protruding portion or a chamfered portion to the extent that the same effects are produced.

On the other hand, the expression "comprising a component", "containing a component", "being provided with a component", "including a component", or "having a component" is not an exclusive expression that excludes the existence of other components.

Figure 2:
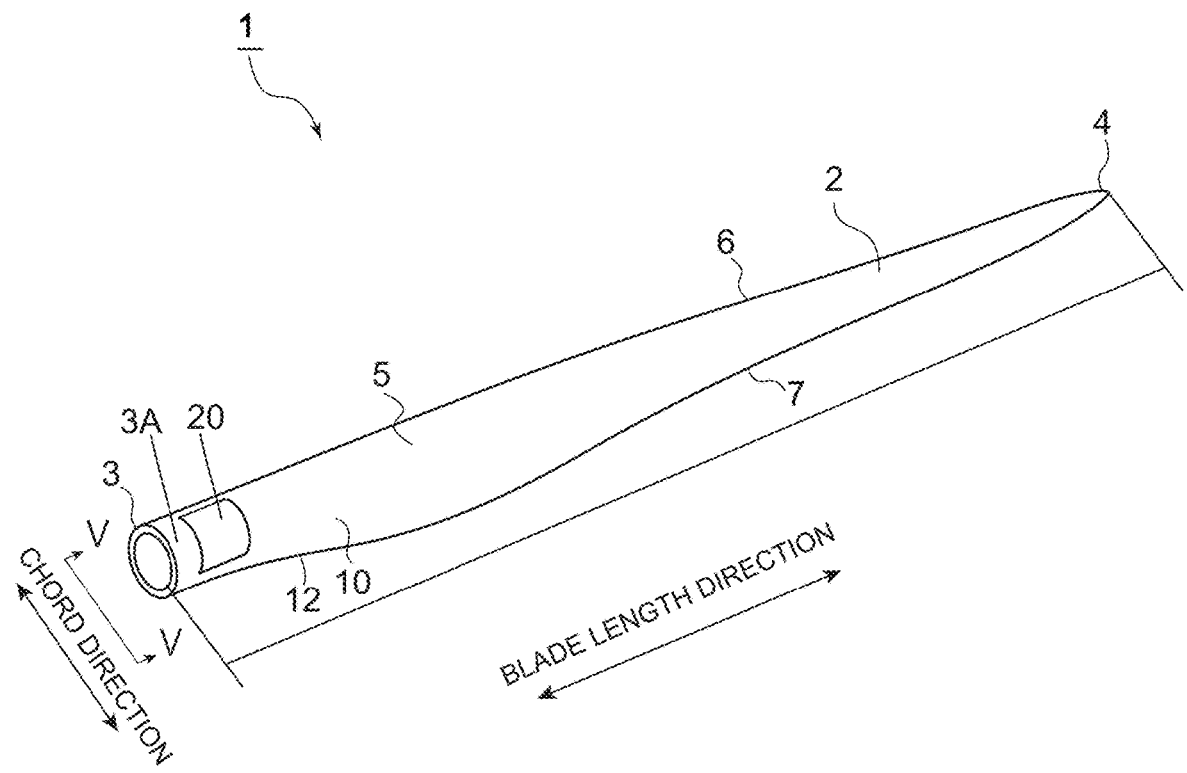
FIG. 2 is a perspective view depicting the whole wind turbine blade according to an embodiment.
Figure 3:
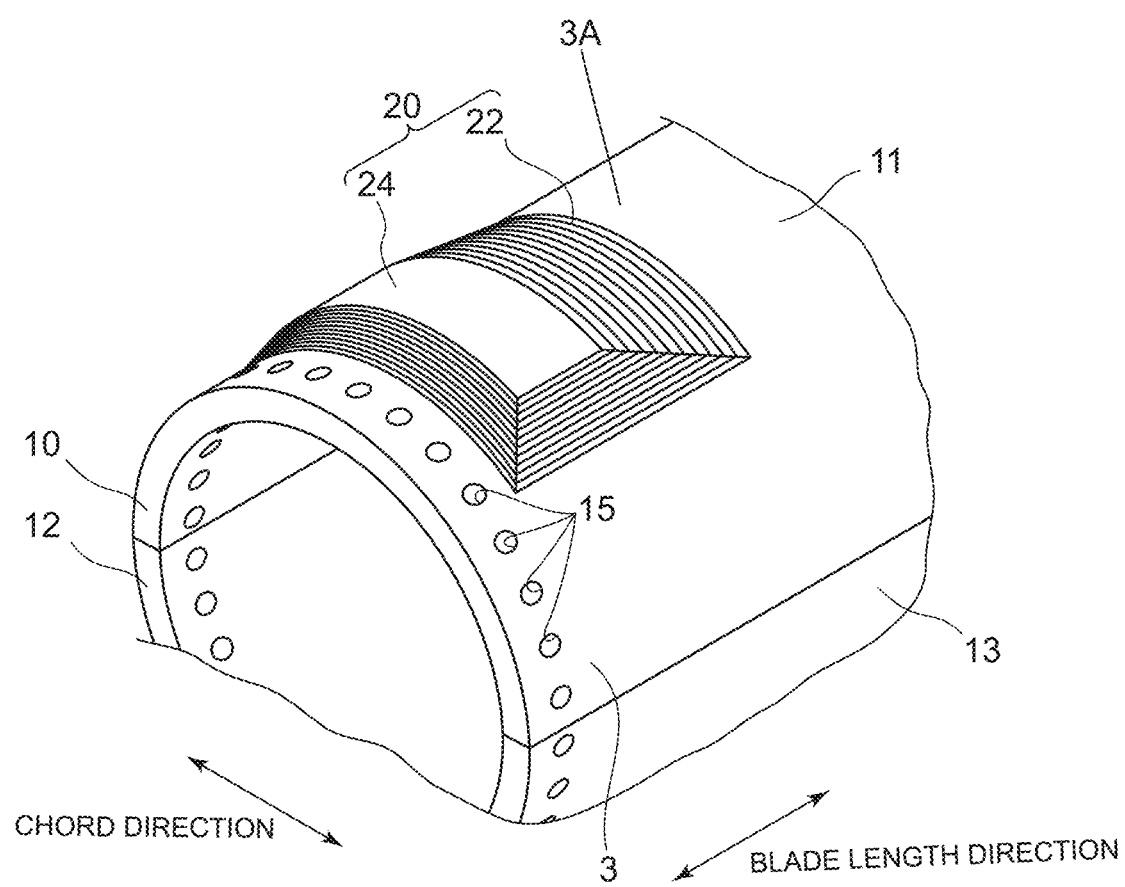
FIG. 3 is a perspective view depicting a reinforced portion (FRP reinforcing layer) of the wind turbine blade according to an embodiment.

FIG. 1 is a schematic diagram depicting a wind turbine generator system according to an embodiment. FIG. 2 is a perspective view depicting the entire wind turbine blade according to an embodiment. FIG. 3 is a perspective view depicting a reinforced portion (FRP reinforcing layer) of the wind turbine blade according to an embodiment.

As depicted in FIG. 1, the wind turbine generator system according to at least several embodiments of the present invention (hereinafter referred to as a windmill 100) includes a rotor 101 including a plurality of (in the example illustrated in FIG. 1, three) wind turbine blades 1 and a hub 102 to which the wind turbine blades 1 are attached, a nacelle 103 rotatably supporting the rotor 101 via a main shaft and a main bearing not depicted in the drawings, a tower 104 that supports the nacelle 103 so as to enable the nacelle to turn in the horizontal direction, and a base 105 on which the tower 104 is installed. The number of the wind turbine blades 1 may be more or less than three.

As depicted in FIG. 2, in several embodiments, the wind turbine blade 1 includes a blade main body 2 extending from a blade root portion 3 toward a blade tip portion 4 and an FRP reinforcing layer 20 formed to cover at least a part of an outer surface 3A of the blade root portion 3 of the blade main body 2. The blade main body 2 will be described below, and then, the FRP reinforcing layer 20 will be described in detail.

The blade main body 2 includes the blade root portion 3 attached to the hub 102 of the windmill 100, the blade tip portion 4 positioned furthest from the hub 102, and an airfoil portion 5 extending in a blade length direction between the blade root portion 3 and the blade tip portion 4. The blade main body 2 has a leading edge 6 and a trailing edge 7 extending from the blade root portion 3 to the blade tip portion 4. An external shape of the blade main body 2 is defined by a suction surface 11 (negative pressure surface) and a pressure surface 13 (positive pressure surface) opposite to the suction surface 11.

The "blade length direction" as used herein refers to a direction along which the blade root portion 3 and the blade tip portion 4 are connected together. The "chord direction (blade chord direction)" as used herein refers to a direction along a line (chord) with which the leading edge 6 and the trailing edge 7 of the blade main body 2 are connected together. The "blade root portion" as used herein refers to a cylindrical portion of the wind turbine blade 1 that is cross-sectionally shaped generally like a circle and that corresponds to, for example, a range of 5 m with reference to an blade root-side end face of the blade main body 2 of the wind turbine blade 1 (typically a range of 1 to 3 m from the end face).

In several embodiments, the blade main body 2 includes a first half-section 10 (suction-side half-section) forming the above-described suction surface 11 side (suction side) and a second half-section 12 (pressure-side half-section) forming a pressure surface 13 side (pressure side), with a boundary between the first half-section 10 and the second half-section 12 corresponding to a line with which the leading edge 6 and the trailing edge 7 are connected together, for example, as depicted in FIG. 2 and FIG. 3. That is, in several embodiments, the blade main body 2 may include the suction-side half-section (first section 10) and the pressure-side half-section (second section 12) joined to the suction-side half-section. The first section 10 and the second section 12 may define the external shape of the blade main body 2 by being integrally joined together at ends corresponding to the leading edge 6 and the trailing edge 7, respectively. In several embodiments, inner surfaces of the first section 10 and the second section 12 that face each other may be coupled together in the blade length direction by at least one shear web not depicted in the drawings.

In several embodiments, the blade main body 2 may have a bolt hole 15 in the blade root portion 3 through which the wind turbine blade 1 is attached to the hub 102. That is, as depicted in FIG. 3, a plurality of bolt holes 15, through which bolts (T bolts) is tightened, are formed in the blade root portion 3 at regular intervals along the circumferential direction thereof so that the wind turbine blade 1 is attached to the hub 102 through the bolt holes 15. The bolt holes 15 are formed by drilling at positions at a predetermined distance from a hub-side end face of the blade root portion 3 according to the length of bolts not depicted in the drawings.

In several embodiments, an FRP reinforcing layer 20 may be provided further toward the blade tip side than the extension range of the bolt holes 15 in the longitudinal direction (blade length direction) of the wind turbine blade 1. This inhibits the FRP reinforcing layer 20 from closing the bolt holes 15 through which the wind turbine blade 1 is attached to the hub 102. Therefore, the wind turbine blade 1 can be reinforced without hampering a function to attach the wind turbine blade 1 to the hub 102 via the bolt holes 15 or an operation of performing such attachment.

Now, the FRP reinforcing layer 20 will be described.

Figure 11A:
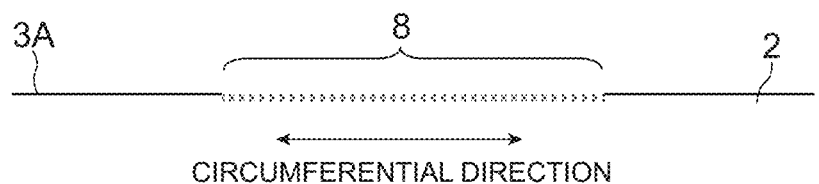
FIG. 11A is a schematic diagram illustrating a step of roughening the configuration area of a blade surface, in the reinforcing method for the wind turbine blade according to an embodiment.
Figure 11B:
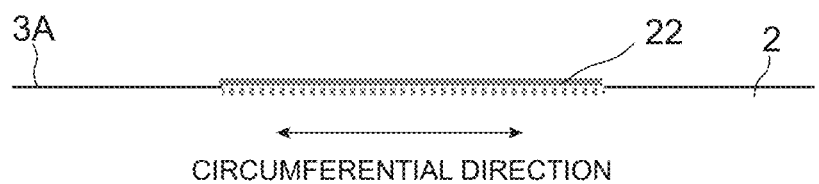
FIG. 11B is a schematic diagram illustrating a step of forming an intermediate layer in the roughened configuration are, in the reinforcing method for the wind turbine blade according to an embodiment.
Figure 11C:
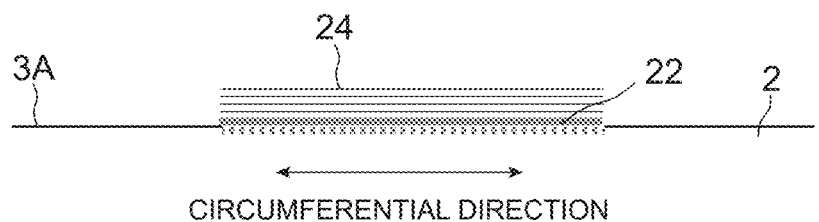
FIG. 11C is a schematic diagram illustrating a step of forming fiber layers on the intermediate layer, in the reinforcing method for the wind turbine blade according to an embodiment.
Figure 11D:
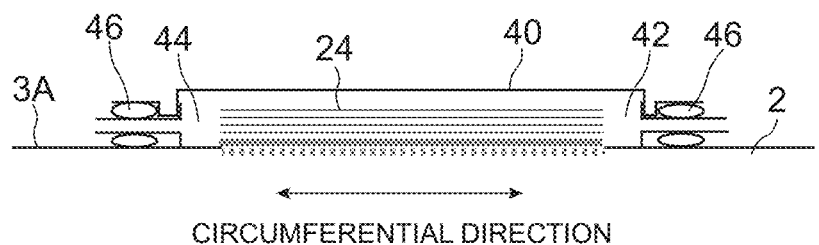
FIG. 11D is a schematic diagram illustrating a step of covering the laminated fiber layers with a bag, in the reinforcing method for the wind turbine blade according to an embodiment.
Figure 11E:
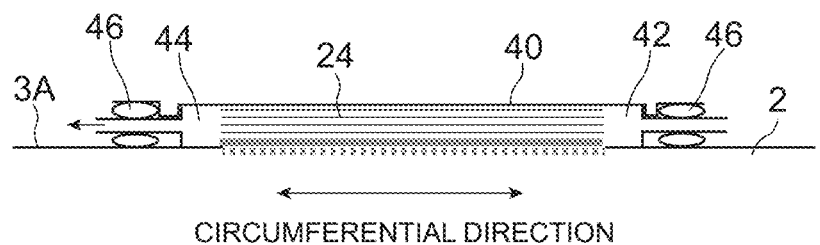
FIG. 11E is a schematic diagram illustrating a step of decompressing a space enclosed by an outer surface of the blade root portion and the bag, in the reinforcing method for the wind turbine blade according to an embodiment.
Figure 11F:
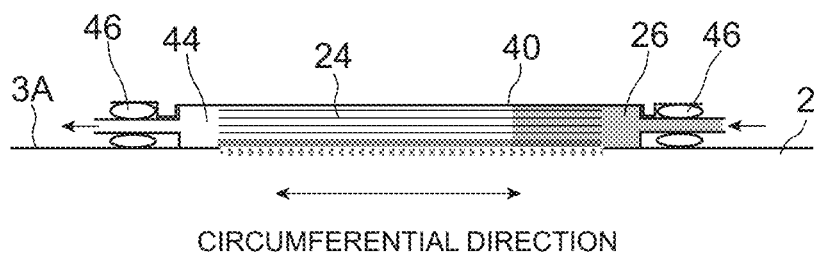
FIG. 11F is a schematic diagram illustrating a step of impregnating the fibers layers with a resin, in the reinforcing method for the wind turbine blade according to an embodiment.
Figure 11G:
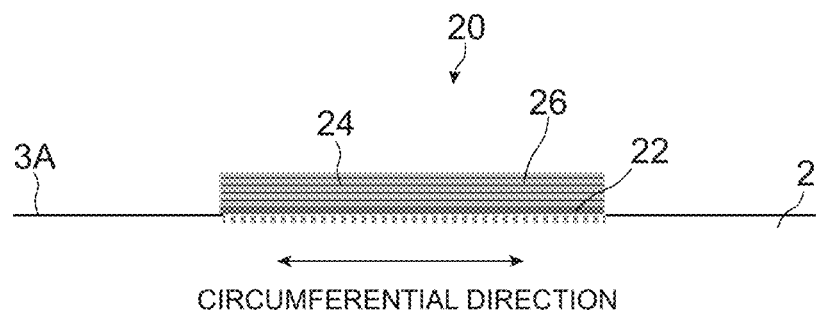
FIG. 11G is a schematic diagram illustrating the FRP reinforcing layer formed on the outer surface of the blade root portion by curing the resin, in the reinforcing method for the wind turbine blade according to an embodiment.

In several embodiments, the FRP reinforcing layer 20 includes a plurality of laminated fiber layers 24 and a resin 26 with which the plurality of fiber layers 24 is impregnated (see FIG. 11F and FIG. 11G).

Each of the fiber layers 24 may be formed of, for example, what is called a unidirectional (UD) layer in which fibers of a composite material (FRP such as CFRP or GFRP) including carbon fiber or glass fiber are arranged in alignment in a single direction. In this case, in the FRP reinforcing layer 20, the fiber layers 24 may be oriented such that a fiber direction in the UD layer extends along the blade length direction.

The number of the laminated fiber layers 24 is not particularly limited. However, in several embodiments, for example the number of the laminated fiber layers 24 may be 10 or more and 100 or less. In several embodiments, the fiber layers 24 may be laminated so as to have a thickness that enables reinforcement for a needed strength corresponding to the distribution of stress near the blade root portion 3 of the wind turbine blade 1. This allows the wind turbine blade 1 to be appropriately reinforced in accordance with the distribution of stress near the blade root portion 3 of the wind turbine blade 1.

Figure 4:
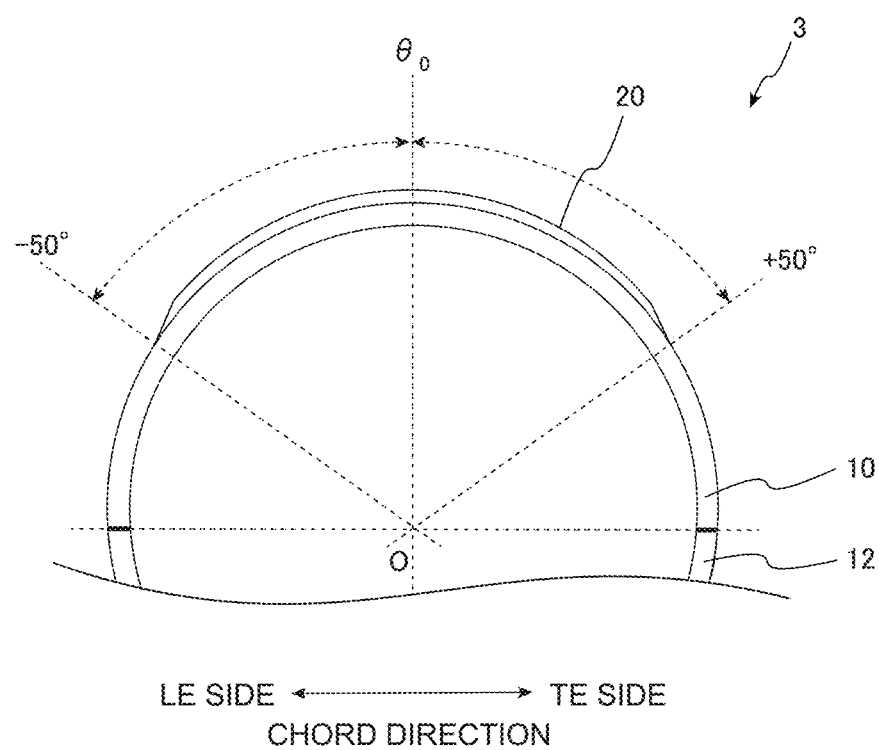
FIG. 4 is a diagram depicting the reinforced portion of the wind turbine blade according to an embodiment and illustrating the shape of both ends of the FRP reinforcing layer and a configuration area of the FRP reinforcing layer in a circumferential direction of a blade root portion.

FIG. 4 is a diagram depicting the reinforced portion of the wind turbine blade according to an embodiment and illustrating the shape of both ends of the FRP reinforcing layer and a configuration area of the FRP reinforcing layer in the circumferential direction of the blade root portion.

As depicted in FIG. 3 and FIG. 4, in several embodiments, the FRP reinforcing layer 20 may be formed such that, for example, both ends of the plurality of laminated fiber layers 24 in the circumferential direction of the blade root portion 3 may be tapered in a cross section of the blade root portion 3. This allows the thickness of the blade root portion 3 in the circumferential direction thereof to vary sufficiently gradually to enable the wind turbine blade 1 to be reinforced while suppressing possible stress concentration. In several embodiments, the tapered shapes of both ends of the FRP reinforcing layer 20 in the circumferential direction of the blade root portion 3 may have the same gradient. In other embodiments, the tapered shapes of both ends of the FRP reinforcing layer 20 in the circumferential direction of the blade root portion 3 may have different gradients.

In several embodiments, the FRP reinforcing layer 20 is formed, in the circumferential direction of the blade root portion 3, within an angular range of $\theta_0 - 50$ degrees $\leq \theta \leq \theta_0 + 50$ degrees when the angular position of the center of a circular arc defined in a cross section of the blade root portion 3 by at least one of the first section 10 (suction-side half-section) and the second section 12 (pressure-side half-section) is denoted by $\theta_0$, as depicted in FIG. 4, for example. This allows appropriate reinforcement of a part of the blade root portion 3 on which a heavy load is imposed in a flap direction by bending stress.

Figure 5:
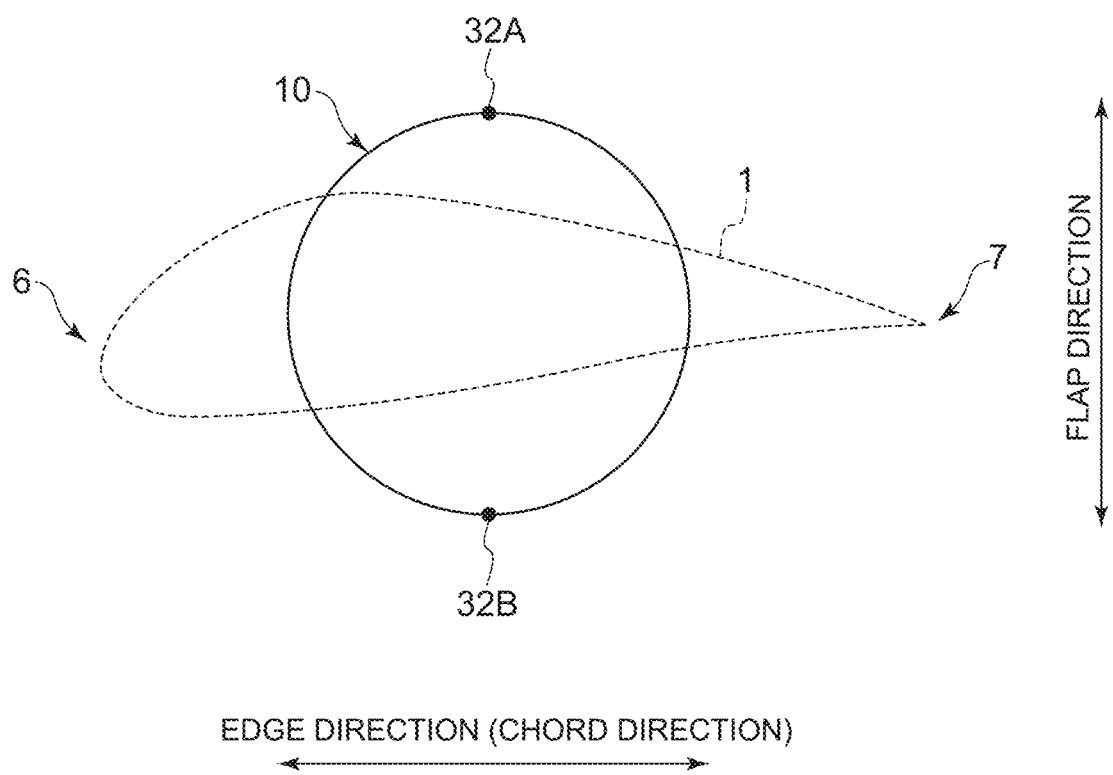
FIG. 5 is a schematic diagram taken along arrow V-V in FIG. 2 and illustrating the shape of the wind turbine blade.

Now, with reference to FIG. 5, the load imposed on the wind turbine blade 1 in the flap direction will be described. FIG. 5 is a schematic diagram taken along arrow V-V in FIG. 2 and illustrating the shape of the wind turbine blade.

As depicted in FIG. 5, the wind turbine blade 1 has the blade root portion 3 shaped like a cylinder cross-sectionally shaped generally like a circle and an airfoil portion 5 extending from the blade root portion 3 to the blade tip portion 4 and cross-sectionally shaped generally like a blade (see a dashed line in FIG. 5). In FIG. 5, the flap direction is a direction corresponding to a line which is orthogonal to a direction of the chord connecting the leading edge 6 and the trailing edge 7, and with which the suction side and the pressure side of the blade main body 2 are connected together. At the time of a strong wind, a heavy load acts on both ends of the blade root portion 3 in the flap direction, that is, a suction-side end 32A and a pressure-side end 32B of the blade root portion 3. Thus, reinforcing the suction or pressure side of the blade root portion 3 of the wind turbine blade 1 allows a significant reinforcing effect to be exerted on the wind turbine blade 1 and, in particular, is important for providing additional reinforcement for increasing fatigue strength in the blade length direction corresponding to the longitudinal direction of the wind turbine blade 1.

Figure 6:
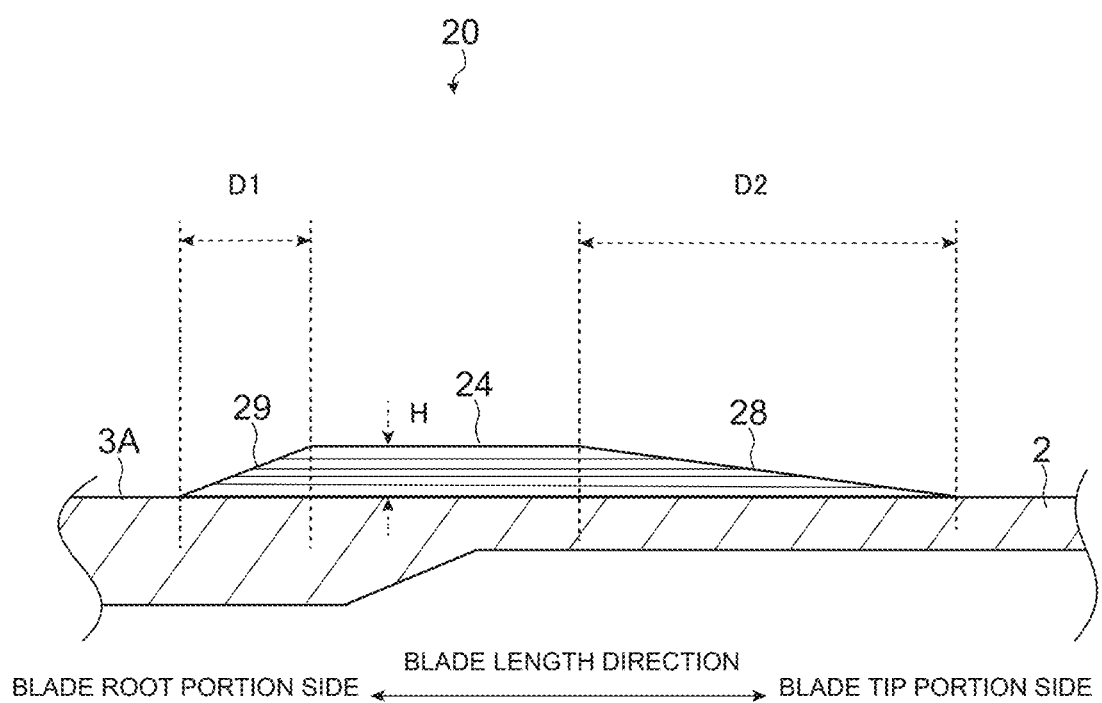
FIG. 6 is a diagram depicting the reinforced portion of the wind turbine blade according to an embodiment and illustrating the shape of both ends of the reinforced portion in a longitudinal direction of the wind turbine blade.
Figure 7:
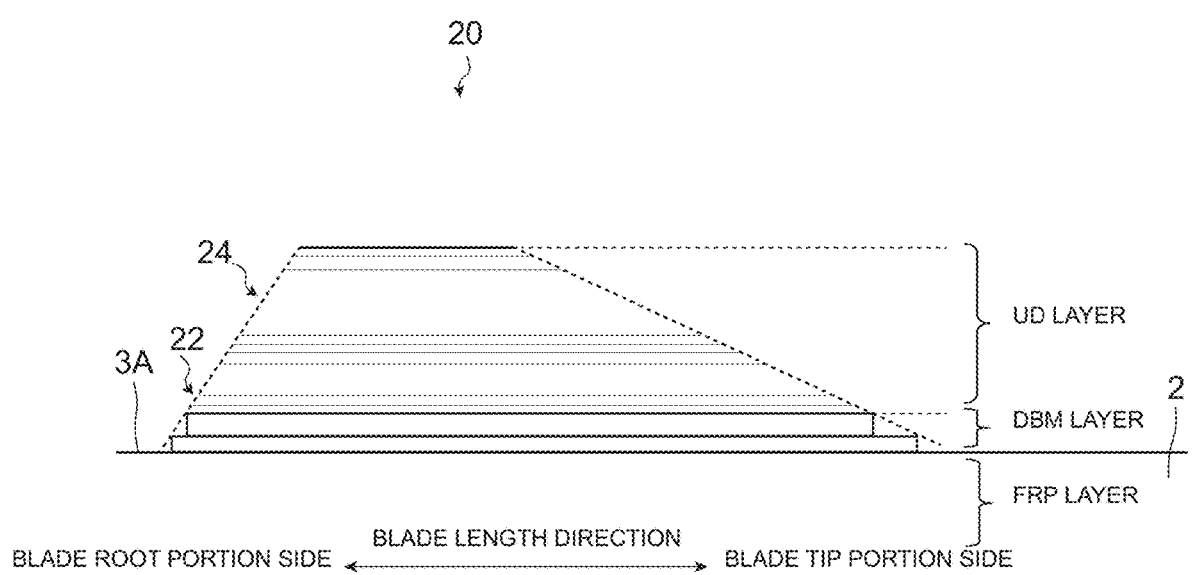
FIG. 7 is a diagram depicting a configuration of the FRP reinforcing layer in an embodiment.

FIG. 6 is a diagram depicting the reinforced portion of the wind turbine blade according to an embodiment and illustrating the shape of both ends of the reinforced portion in the longitudinal direction of the wind turbine blade. FIG. 7 is a diagram depicting a configuration of the FRP reinforcing layer in an embodiment.

In several embodiments, the FRP reinforcing layer 20 is formed such that, in a cross section along a longitudinal direction of the blade main body 2, both ends of the plurality of laminated fiber layers 24 in the longitudinal direction may be tapered, for example, as depicted in FIG. 3, FIG. 6, and FIG. 7. This allows the FRP reinforcing layer 20 including the plurality of fiber layers 24 impregnated with the resin 26 to cover at least a part of the outer surface 3A of the blade root portion 3 of the blade main body 2 for reinforcement. The FRP reinforcing layer 20 is formed such that, in a cross section along the longitudinal direction of the blade main body 2, both ends of the plurality of laminated fiber layers 24 in the longitudinal direction are tapered. Thus, the thickness of the blade root portion 3 of the wind turbine blade 1 including the FRP reinforcing layer 20 is inhibited from varying sharply in the longitudinal direction of the wind turbine blade 1. Therefore, the FRP reinforcing layer 20 allows the wind turbine blade to be reinforced while appropriately suppressing possible stress concentration resulting from a load imposed on the blade root portion 3 of the wind turbine blade 1 in the flap direction.

As depicted in FIG. 3 and FIG. 6, the blade root portion 3 of the blade main body 2 has a hollow shell structure and has an area where the thickness of the blade main body 2 is varied according to the needed strength. Thus, for example, as depicted in FIG. 6, the blade root portion 3 can be appropriately reinforced by providing the FRP reinforcing layer 20 on the outer surface 3A of the area where the thickness of the blade main body 2 is varied.

In several embodiments, the first tapered shape (the inclination angle of a first inclined portion 28) of the blade tip-side end of both ends of the plurality of laminated fiber layers 24 may be gentler than the second tapered shape (the inclination angle of a second inclined portion 29) of the blade root-side end of both ends of the plurality of laminated fiber layers 24, for example, as depicted in FIG. 3, FIG. 6, and FIG. 7.

Specifically, as shown in FIG. 6 the FRP reinforcing layer 20 may be formed such that, when a distance D1 extends, along the blade length direction, from the blade root portion 3-side end of the FRP reinforcing layer 20 in the blade length direction, that is, the blade root portion 3-side end of the lowermost layer in the FRP reinforcing layer 20, to the blade root portion 3-side end of the uppermost layer of the fiber layers 24 corresponding to the uppermost layer in the FRP reinforcing layer 20, a distance D2 extends, along the blade length direction, from the blade tip portion 4-side end of the lowest layer in the FRP reinforcing layer 20 to the blade tip portion 4-side end of the uppermost layer of the fiber layers 24 corresponding to the uppermost layer in the FRP reinforcing layer 20, and a height H extends from the outer surface 3A of the blade main body 2 to an upper surface of the uppermost layer in the FRP reinforcing layer 20, a relation in Expression (1) is met.

[Math. 1]

$$H/D2 < H < D1 \qquad (1)$$

In the above-described configuration, both ends of the plurality of laminated fiber layers 24 may be formed such that the first inclined portion 28 of the blade tip portion-side end, which has a spare installation area, is sufficiently gentler than the second inclined portion 29 of the blade root portion-side end. Therefore, the thickness of the blade root portion 3 in the longitudinal direction may vary sufficiently gradually. This allows the wind turbine blade 1 to be reinforced while suppressing possible stress concentration resulting from a load in the flap direction.

In several embodiments, the first inclined portion 28 of the blade tip portion-side end of both ends of the plurality of laminated fiber layers 24 may have an inclined surface with a gradient of 5% or less with respect to the longitudinal direction. In other words, the first inclined portion 28 may be formed so as to meet a relation in Expression (2) using the above-described distance D2 and height H.

[Math. 2]

$$H/D2 \leq 0.05 \qquad (2)$$

In above-described configuration, the inclined surface of the blade tip portion-side end of the fiber layers 24 may have a sufficiently gentle gradient of 5% or less with respect to the longitudinal direction of the wind turbine blade 1. This enables the thickness of the blade root portion 3 in the blade length direction to vary sufficiently gradually, allowing the wind turbine blade 1 to be reinforced while suppressing possible stress concentration resulting from a load in the flap direction.

In several embodiments, the second inclined portion 29 of the blade root portion 3-side end of both ends of the plurality of laminated fiber layers 24 may have an inclined surface with a gradient of 10% or less with respect to the longitudinal direction. In other words, the second inclined portion 29 may be formed so as to meet a relation in Expression (3) using the above-described distance D1 and height H.

[Math. 3]

$$H/D1 \leq 0.1 \qquad (3)$$

In the above-described configuration, the second inclined portion 29 of the blade root portion 3-side end may also be formed such that the thickness of the blade root portion 3 in the blade length direction varies sufficiently gradually, allowing the wind turbine blade 1 to be reinforced while suppressing possible stress concentration resulting from a load in the flap direction.

In several embodiments, the FRP reinforcing layer 20 may include an intermediate layer 22 formed of a multidirectional fiber layer between the outer surface 3A of the blade root portion 3 and the plurality of fiber layers 24 (see, for example, FIG. 11C and FIG. 11G). The multidirectional fiber layer as used herein refers to a layer in which fibers are entangled with one another in different directions. This configuration allows the fiber layers 24 to be more appropriately bonded to the outer surface 3A of the wind turbine blade 1.

In several embodiments, the intermediate layer 22 may be, for example, a double bias mat (DBM) material. The double bias mat material is a mat material that is a combination of fibers arrayed in two different directions (for example, ±45°). In several embodiments, the intermediate layer 22 may be, for example, a chopped strand mat. The chopped strand mat is a sheet (non-woven cloth) into which fiber pieces (having a length of, for example, 5 to 200 mm) resulting from chopping of twisted yarns (strands) are dispersed uniformly in a non-oriented manner and shaped using a binding agent (for example, a polyester binder). The chopped strand mat can be suitably used as the intermediate layer 22 because of its non-directional substrate strength and its excellent performance in impregnation, deforming, and mold conformance. In this configuration, the fiber layers 24 can be more appropriately bonded to the outer surface 3A of the wind turbine blade 1 by using the double bias mat or the chopped strand mat in which the fibers are entangled with one another.

In several embodiments, a polyester resin or an epoxy resin may be used as the resin 26. In this case, the FRP reinforcing layer 20 can be formed by impregnating the fiber layers 24 with a thermoplastic resin such as the polyester resin or the epoxy resin, which is then cured. For example, if the fiber layers 24 are impregnated with the polyester resin, which is then cured, the curing results from self-heating, eliminating the need for an external heating operation to allow the FRP reinforcing layer 20 to be easily and inexpensively formed. If the fiber layers 24 are impregnated with the epoxy resin, which is then cured, the FRP reinforcing layer 20 can be formed which is more excellently bonded to the outer surface 3A of the blade root portion 3.

If an outer circumferential side of the blade root portion 3 of the wind turbine blade 1 is to be reinforced, the wind turbine blade 1 may temporarily be removed from the hub 102 and placed on the ground, and a plurality of operators may perform a reinforcing operation on a large area of the blade surface. Thus, this case allows reinforcing operability to be improved compared to a case where reinforcement is executed on an inner circumferential side of the blade root portion 3 on which only fewer operators can perform operation due to space limitations.

Now, a reinforcing method for the wind turbine blade 1 according to several embodiments will be described with reference to FIG. 8 to FIG. 10 and FIG. 11A to FIG. 11G FIG. 8 to FIG. 10 are flowcharts illustrating a reinforcing method for the wind turbine blade according to an embodiment. Each of FIG. 11A to FIG. 11G is a schematic diagram illustrating the reinforcing method for the wind turbine blade according to an embodiment.

Figure 8:
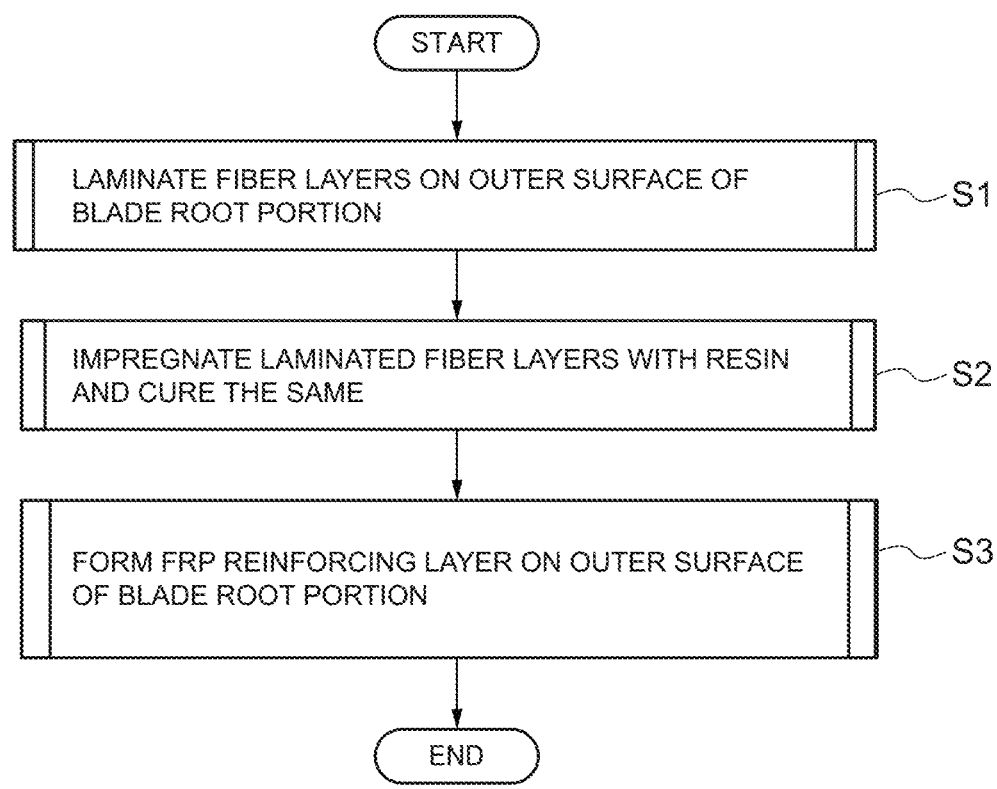
FIG. 8 is a flowchart illustrating a reinforcing method for a wind turbine blade according to an embodiment.

As depicted in FIG. 8, in several embodiments, when the wind turbine blade 1 is reinforced, the fiber layers 24 may be laminated on the outer surface 3A of the blade root portion 3 of the wind turbine blade 1 so as to cover at least a part of the outer surface 3A (step S1), the laminated fiber layers 24 may be impregnated with the resin 26, which is then cured (step S2), and the FRP reinforcing layer 20 may be formed on the outer surface 3A of the blade root portion 3 (step S3). In the laminating step, the above-described UD layers may be laminated as the fiber layers 24 (see FIG. 11C). In the step of impregnating the fiber layers 24 with the resin 26 and curing the resin 26, the curing is preferably performed after the laminated fiber layers 24 are impregnated with the resin 26 (see FIG. 11F) such that the resin 26 sufficiently infiltrates among the fibers in the fiber layers 24. In the step of forming the FRP reinforcing layer 20, a processing treatment for surface finish may be executed on the surface of the FRP reinforcing layer 20 (see FIG. 11G) formed on the outer surface 3A of the blade root portion 3.

In the step of laminating the fiber layers 24, the fiber layers 24 may be laminated such that, in a cross section of the wind turbine blade 1 in the longitudinal direction thereof, both ends of the laminated fiber layers 24 in the longitudinal direction have tapered shapes (first tapered shape and second tapered shape). In this method, the FRP reinforcing layer 20 is configured such that, in a cross section of the blade main body 2 in the longitudinal direction thereof, both ends of the plurality of laminated fiber layers 24 in the longitudinal direction have tapered shapes, inhibiting the thickness of the blade root portion 3 of the wind turbine blade 1 including the FRP reinforcing layer 20 from varying sharply in the longitudinal direction of the wind turbine blade 1. Therefore, the method allows the wind turbine blade 1 to be reinforced while appropriately suppressing possible stress concentration resulting from a load imposed on the blade root portion 3 of the wind turbine blade 1 in the flap direction.

In several embodiments, the fiber layers 24 may be laminated such that the first inclined portion 28 of the blade tip-side end of both ends of the laminated fiber layers 24 has a smaller inclination angle than the second inclined portion 29 of the blade root-side end of both ends of the laminated fiber layers 24. The method allows the first inclined portion 28 of the blade tip-side end of both ends of the plurality of laminated fiber layers 24, which has a spare installation area, to be formed sufficiently more gently than the second inclined portion 29 of the blade root-side end of both ends of the plurality of laminated fiber layers 24. Therefore, the method enables the thickness of the blade root portion 3 in the longitudinal direction to vary sufficiently gradually, allowing the wind turbine blade 1 to be reinforced while suitably suppressing possible stress concentration resulting from a load in the flap direction.

Figure 9:
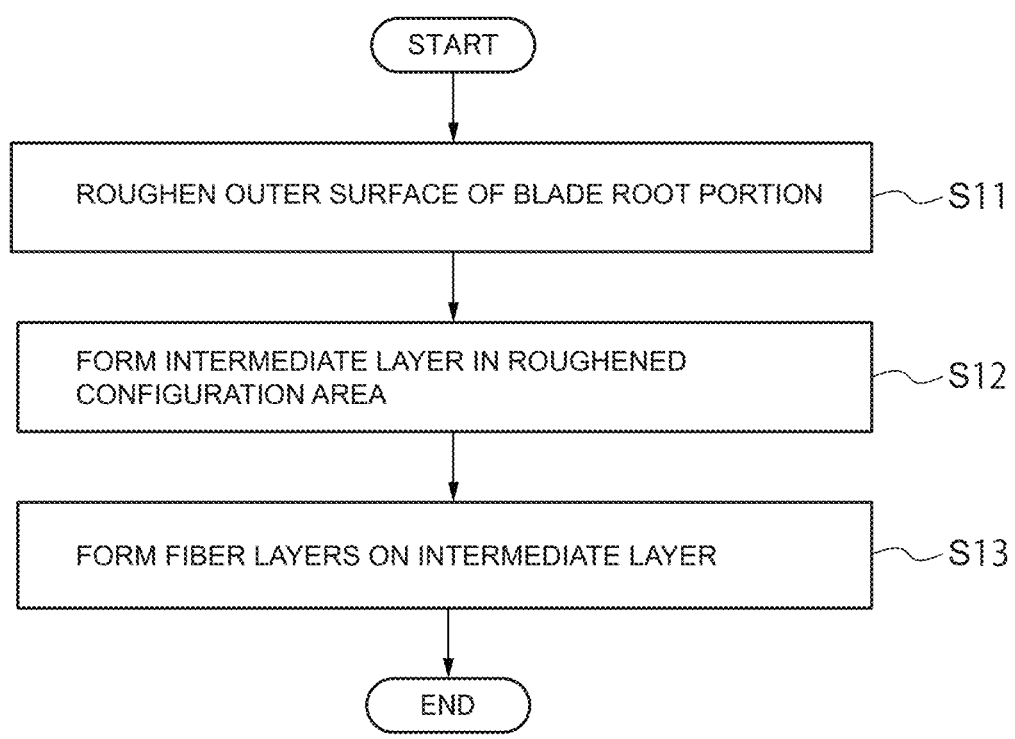
FIG. 9 is a flowchart illustrating a reinforcing method for a wind turbine blade according to an embodiment.

As depicted in FIG. 9, in several embodiments, at least the configuration area 8 of the outer surface 3A of the blade root portion 3 where the FRP reinforcing layer 20 is to be configured may be roughened (step S11), the intermediate layer 22 may be formed in the roughened configuration area 8 of the outer surface 3A of the blade root portion 3 (step S12), and the fiber layers 24 may be laminated on the intermediate layer 22 (step S13). In the roughening step, for example, a gel coat layer is removed from the outer surface 3A of the blade root portion 3 by sanding or the like to expose the FRP layer (see FIG. 7) in the blade root portion 3 as depicted in FIG. 11A. In the step of forming the intermediate layer 22, the DBM including the multidirectional fiber layer or the chopped strand mat as described above may be stuck to the roughened configuration area 8 (see FIG. 11B).

The method may involve, instead of laminating the fiber layers 24 directly on the outer surface 3A of the blade root portion 3, roughening at least the configuration area 8 of the outer surface 3A of the blade root portion 3 where the FRP reinforcing layer 20 is to be configured, forming the intermediate layer 22 in the roughened configuration area 8, and laminating the fiber layers 24 on the intermediate layer 22. Therefore, the fiber layers 24 can be more appropriately bonded to the outer surface 3A of the wind turbine blade 1 by, for example, using, as the intermediate layer 22, a material that can be appropriately bonded to the outer surface 3A and the fiber layers 24 of the wind turbine blade 1. Consequently, the FRP reinforcing layer 20 can be formed more integrally with the wind turbine blade 1, allowing the wind turbine blade 1 to be more firmly reinforced.

Figure 10:
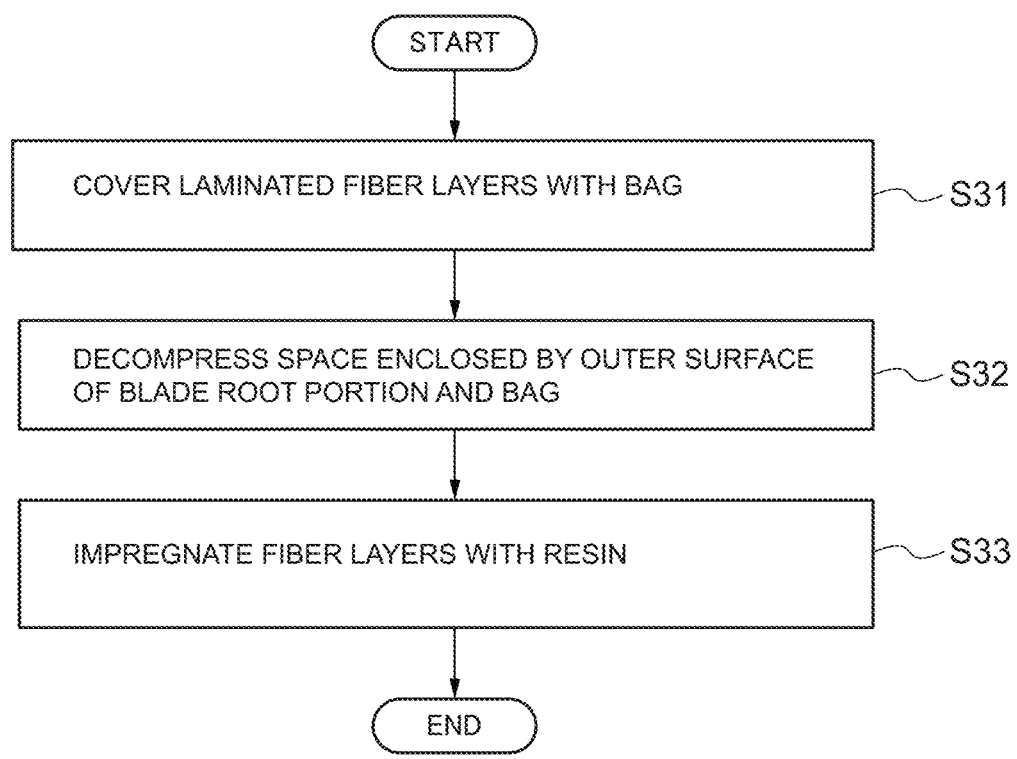
FIG. 10 is a flowchart illustrating a reinforcing method for a wind turbine blade according to an embodiment.

In several embodiments, in the step of forming the FRP reinforcing layer 20, the laminated fiber layers 24 may be covered with a bag 40 (step S31), a space enclosed by the outer surface 3A of the blade root portion 3 and the bag 40 may be decompressed (step S32), and the resin 26 may be injected into the decompressed space to impregnate the fiber layers 24 with the resin 26 (step S33) as depicted in FIG. 10. That is, the method may be, for example, a method of vacuum assisted resin transfer molding (VaRTM). The vacuum assisted resin transfer molding, for example, does not need to use a massive facility such as an autoclave in reinforcing the wind turbine blade 1, facilitating integral molding for the blade main body 2 and the reinforced portion (FRP reinforcing layer 20). The vacuum assisted resin transfer molding also provides an appropriate work environment due to less volatilization of an organic solvent. In the step of covering the fiber layers 24 with the bag 40, for example, as depicted in FIG. 11D, the fiber layers 24 are covered with the bag 40 such that the fiber layers 24 are enclosed and the space between an end of the bag 40 and the outer surface 3A of the blade root portion 3 is sealed in an airtight manner using a seal 46. In the decompressing step, air in the internal space enclosed by the bag 40 and the outer surface 3A is sucked (ventilated) toward the outside of the bag 40 via a suction port 44 provided in a part of the space, for example, as depicted in FIG. 11E. In the impregnating step, the resin 26 is injected into the decompressed bag 40 through an injection port 42 provided at a position different from the position of the suction port 44, for example, as depicted in FIG. 11F.

In the method, the fiber layers 24 laminated on the outer surface 3A of the blade root portion 3 are covered with the bag 40, the space enclosed by the outer surface 3A of the blade root portion 3 and the bag 40 is decompressed, and the resin 26 is injected into the decompressed space. Therefore, the resin 26 can be infiltrated throughout the fiber layers 24, providing an FRP reinforcing layer 20 having few voids and a high strength.

The embodiments of the present invention have been described. However, the present invention is not limited to the above-described embodiments and includes variations of the embodiments and appropriate combinations of the variations.

The invention claimed is:

1. A wind turbine blade comprising:
    a blade main body extending from a blade root portion toward a blade tip portion; and
    an FRP (Fiber Reinforced Plastic) reinforcing layer formed so as to cover at least a part of an outer surface of the blade root portion of the blade main body, wherein
    the FRP reinforcing layer includes:
        a plurality of laminated fiber layers, wherein each of the plurality of laminated fiber layer is a unidirectional layer; and
        a resin with which the plurality of fiber layers is impregnated, and
    the FRP reinforcing layer is formed such that:
        in a cross section along a longitudinal direction of the blade main body and over the entire region of each of the plurality of laminated fiber layers in the longitudinal direction, each fiber of said each of the plurality of laminated fiber layers extends linearly in the longitudinal direction along the outer surface of the blade root portion; and
        both ends of the plurality of laminated fiber layers in the longitudinal direction thereof are tapered.

2. The wind turbine blade according to claim 1, wherein a first tapered shape of a blade tip-side end of both of the ends of the plurality of laminated fiber layers is different from a second tapered shape of a blade root-side end of both the ends of the plurality of laminated fiber layers.

3. The wind turbine blade according to claim 1, wherein the first tapered shape of the blade tip-side end of both of the ends of the plurality of laminated fiber layers has an inclined surface with a gradient of 5% or less with respect to the longitudinal direction.

4. The wind turbine blade according to claim 1, wherein the FRP reinforcing layer includes an intermediate layer between the outer surface of the blade root portion and the plurality of fiber layers and comprising a multidirectional fiber layer.

5. The wind turbine blade according to claim 4, wherein the intermediate layer is a DBM (Dense Bituminous Macadam) or a chopped strand mat.

6. The wind turbine blade according to claim 1, wherein a number of laminated fiber layers in the plurality of laminated fiber layers is 10 or more and 100 or less.

7. The wind turbine blade according to claim 1, wherein the resin is a polyester resin or an epoxy resin.

8. The wind turbine blade according to claim 1, wherein the blade main body includes:
    a suction-side half-section;
    a pressure-side half-section joined to the suction-side half-section, and
    the FRP reinforcing layer, in the circumferential direction of the blade root portion, has an angular range of $\theta_0-50$ degrees$\leq \theta \leq \theta_0+50$ degrees when an angular position of a center of a circular arc defined in a cross section of the blade root portion by at least one of the suction-side half-section or the pressure-side half-section is denoted by $\theta_0$.

9. The wind turbine blade according to claim 1, wherein the blade main body has in the blade root portion a bolt hole through which the wind turbine blade is attachable to a hub, and the FRP reinforcing layer is provided farther toward a blade tip side than an extension range of the bolt hole in the longitudinal direction.

10. A wind turbine blade comprising:

a blade main body extending from a blade root portion toward a blade tip portion; and an FRP (Fiber Reinforced Plastic) reinforcing layer formed so as to cover at least a part of an outer surface of the blade root portion of the blade main body, wherein the FRP reinforcing layer includes:

a plurality of laminated fiber layers, wherein each of the plurality of laminated fiber layer is a unidirectional layer; and a resin with which the plurality of fiber layers is impregnated, and the FRP reinforcing layer is formed such that, in a cross section along a longitudinal direction of the blade main body, each fiber of the plurality of laminated fiber layers extends linearly in the longitudinal direction along the outer surface of the blade root portion and both ends of the plurality of laminated fiber layers in the longitudinal direction thereof are tapered, and wherein each end of the plurality of laminated fiber layers in the longitudinal direction is tapered to incline inwardly in a radial direction of the blade root portion toward an outer edge of the FRP reinforcing layer in the longitudinal direction.

11. The wind turbine blade according to claim 10, wherein a taper angle of a first tapered shape of a blade tip-side end of both the ends of the plurality of laminated fiber layers is less than a taper angle of a second tapered shape of a blade root-side end of both the ends of the plurality of laminated fiber layers.

12. The wind turbine blade according to claim 10, wherein the first tapered shape of the blade tip-side end of both the ends of the plurality of laminated fiber layers has an inclined surface with a gradient of 5% or less with respect to the longitudinal direction.

13. The wind turbine blade according to claim 10, wherein the FRP reinforcing layer includes an intermediate layer positioned between the outer surface of the blade root portion and the plurality of fiber layers and formed of a multidirectional fiber layer.

14. The wind turbine blade according to claim 13, wherein the intermediate layer is a DBM or a chopped strand mat.

15. The wind turbine blade according to claim 10, wherein the number of the laminated fiber layers is 10 or more and 100 or less.

16. The wind turbine blade according to claim 10, wherein the resin is a polyester resin or an epoxy resin.

17. The wind turbine blade according to claim 10, wherein the blade main body includes:

a suction-side half-section and a pressure-side half-section that is joined to the suction-side half-section, and the FRP reinforcing layer is formed, in the circumferential direction of the blade root portion, within an angular range of $\theta_0-50$ degrees$\leq\theta\leq\theta_0+50$ degrees when an angular position of a center of a circular arc defined in a cross section of the blade root portion by at least one of the suction-side half-section or the pressure-side half-section is denoted by $\theta_0$.

18. The wind turbine blade according to claim 10, wherein the blade main body has in the blade root portion a bolt hole through which the wind turbine blade is attached to a hub, and the FRP reinforcing layer is provided further toward a blade tip side than an extension range of the bolt hole in the longitudinal direction.

\* \* \* \* \*